United States Patent [19]

Kim et al.

[11] Patent Number: 4,516,864
[45] Date of Patent: May 14, 1985

[54] NON-CONTACT SENSING APPARATUS AND METHOD FOR POLYMER MELT TEMPERATURE PROFILE DETERMINATION

[75] Inventors: Wontaik Kim, Clifton Park; Farzin H. Azad, Troy, both of N.Y.

[73] Assignee: General Electric Company, Schenectady, N.Y.

[21] Appl. No.: 453,667

[22] Filed: Dec. 27, 1982

[51] Int. Cl.³ .............................................. G01J 5/00
[52] U.S. Cl. .................................. 374/130; 374/131; 374/121; 374/137
[58] Field of Search ............... 250/341, 343, 573, 574; 374/130, 131, 137, 121, 123, 124, 135, 125, 120, 139, 122, 126, 127, 128; 356/43, 44

[56] References Cited

U.S. PATENT DOCUMENTS

| | | | |
|---|---|---|---|
| 3,864,044 | 2/1975 | Lyshkow | 250/573 |
| 3,909,136 | 9/1975 | Thomas | 250/573 |
| 3,932,038 | 1/1976 | Schweizer et al. | 250/573 |
| 4,075,493 | 2/1978 | Wickersheim | 374/131 |
| 4,136,566 | 1/1979 | Christensen | 356/44 |
| 4,212,539 | 7/1980 | Berber et al. | 250/574 |
| 4,227,083 | 10/1980 | Sherinski | 250/341 |
| 4,278,349 | 7/1981 | Sanden | 356/44 |
| 4,313,344 | 2/1982 | Brogardh et al. | 374/126 |
| 4,363,966 | 12/1982 | Cheo | 250/341 |
| 4,376,890 | 3/1983 | Engström et al. | 374/131 |

Primary Examiner—Charles Frankfort
Assistant Examiner—David R. Schuster
Attorney, Agent, or Firm—Lawrence D. Cutter; James C. Davis, Jr.; Marvin Snyder

[57] ABSTRACT

Remote measurement of temperature variations within polymer process melts is performed by irradiating the melt with a collimated radiation source such as laser light and relating the transmitted radiation to the temperature distribution within the melt. A method and apparatus for temperature profile determination is based upon the variation of light transmittance through the melt as a function of temperature and wavelength of the incident light.

9 Claims, 3 Drawing Figures

NON-CONTACT SENSING APPARATUS AND METHOD FOR POLYMER MELT TEMPERATURE PROFILE DETERMINATION

BACKGROUND OF THE DISCLOSURE

The present invention is related to the determination of temperature and temperature profile measurements in flowing polymer melts. More particularly, the present invention is related to non-contact means for determining temperature and temperature profiles within such melts using transmitted and reflected electromagnetic radiation in a selected wavelength range.

Precise measurement and control of polymer melt temperature in polymer processing is essential for ensuring the proper length of the polymer molecules and optimization of the physical properties of the final product. Traditionally, thermocouples have been used to obtain an indication of polymer melt temperature. Such measurements, however, are prone to errors due to several factors. First, frictional heating of the probe by the polymer melt flow itself can lead to erroneous temperature indications. Second, heat transfer from the heated conduit to the thermocouple can also contribute to erroneous temperature indications.

Recently, infrared detectors have been employed in a limited fashion to measure polymer surface temperatures. However, such infrared detectors have not been employed for determining the temperature and temperature profiles within the polymer melts. Their use has been confined to surface temperature measurements. See "Infrared Radiation Techniques for Glass Surface and Temperature Distribution Measurements", by R. Viskanta in the IEEE Trans. Indust., Appl. Vol. IA-11, No. 5 (1975).

It is thus seen that the use of thermocouples immersed in the polymer melt flow are not wholly satisfactory instruments for determining temperature because of the erroneous measurements arising from frictional heating of the thermocouples themselves. Additionally, such thermocouples generally exhibit a relatively slow response time. Moreover, surface temperature measurements performed on polymer melts using emitted radiation are limited because this measurement method is based on the fact that, at certain wavelengths, polymers behave like opaque materials. While this phenomena enables one to determine the temperature of a given surface by measuring the radiative intensity emitted from that surface, it nonetheless does not provide any means for determining interior temperatures which may, in fact, be more critical for ultimate material properties.

Accordingly, it is clear that the development of a method and apparatus capable of remote measurement of the internal temperature profile within a flowing polymer melt would be of great value to the polymer processing industry.

SUMMARY OF THE INVENTION

In accordance with a preferred embodiment of the present invention, an apparatus for temperature measurement in flowing polymer melts comprises a conduit section having at least two optical windows disposed on opposite sides of the flowing polymer material. Means are provided for irradiating the polymer melt through one of the windows and additional means are provided at the opposite window for detecting the level of radiation transmitted through the melt. Knowledge of the surface temperature of the melt, together with knowledge that the temperature profile is typically approximately parabolic in shape, provide a sufficient informational basis for computational means to construct temperature profile data indicative of the temperature variation from one side of the melt flow to the opposite side. In a preferred embodiment of the present invention, the means for irradiating the polymer melt comprises an infrared energy source, such as for example a laser, coupled to the conduit windows through fiber obtic connectors.

Furthermore, in accordance with another embodiment of the present invention, a method for temperature measurement of a flowing polymer melt comprises transmitting electromagnetic radiation of selected wavelength and known intensity to the melt, measuring the intensity of the radiation transmitted through the melt, and correlating the intensity measurement with a temperature profile across the melt. For certain applications, the method of the present invention also preferably includes measuring the surface radiance energy emitted from the surface. The surface temperature measurement is preferably performed on opposite sides of the melt and is particularly useful in those temperature measurement situations in which surface temperature values are not conveniently predetermined as fixed values during the determination of a temperature profile measurement.

Accordingly, it is an object of the present invention to provide non-contacting sensing apparatus for the determination of temperature variations across flowing polymer melts.

It is a further object of the present invention to provide a method for non-contact determination of temperature variations within flowing polymer melts.

It is yet another object of the present invention to provide better temperature control in polymer melt processing to thereby produce improved polymer products.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 3 is a graph of percent transmittance through an epoxy polymer sample as a function of the wavelength of the incident radiation; three graphs are illustrated for three different melt temperatures.

DETAILED DESCRIPTION OF THE INVENTION

Figure 1:
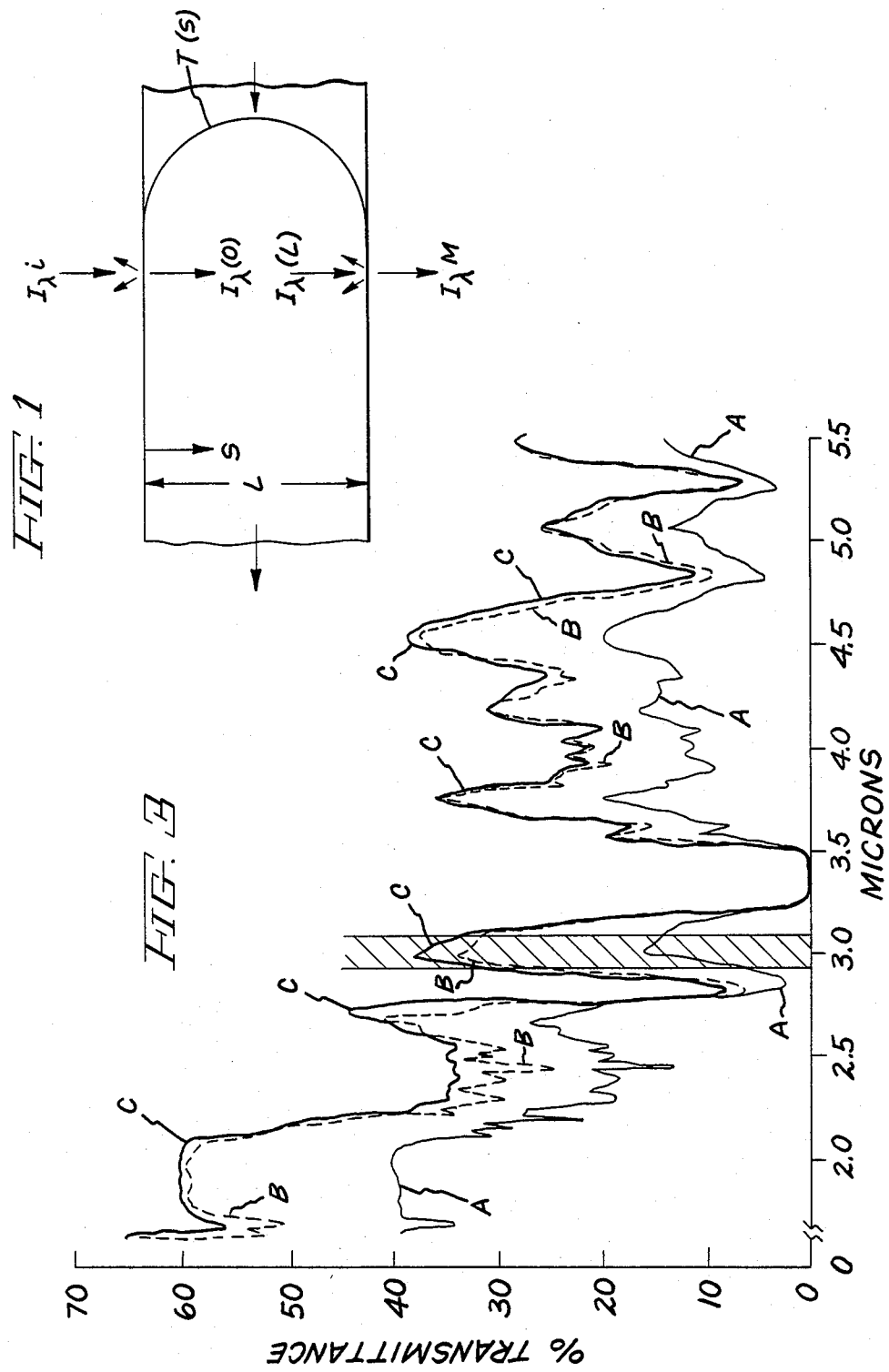
FIG. 1 is a schematic diagram illustrating the typical temperature distribution within a flowing polymer melt.

FIG. 1 illustrates a portion of a flowing mass of polymer material 10, flowing in the direction indicated by the flow arrows. The polymer mass contemplated herein typically has a rectangular cross section, the smaller of the two sides of the rectangle being designated as L. The temperature distribution across the melt is typically parabolic in shape, this being illustrated in FIG. 1 by the curve designated T(s), s being the distance measured from the surface of the melt as shown. Thus, the variable s ranges from 0 to L. In the apparatus and method of the present invention, temperature profile measurement determination is made by irradiating polymer melt 10 with radiation of a known intensity and wavelength and measuring the intensity of the radiation transmitted through the melt. In particular, in FIG. 1 incident radiation having an intensity $I_\lambda^i$ is made to impinge against the melt flow. A certain amount of this radiation is reflected, this reflected level being determined by the interface reflectivity of the melt $\rho_\lambda$. The use of $\lambda$ as a subscript in the variables named herein is meant to indicate a dependence of the variable on the wavelength of the impinging and transmitted radiation. In the present discussion, it is therefore more appropriate to consider $\lambda$ as a parameter, rather than a constant or a variable. Thus, the incident radiation intensity $I_\lambda^i$ results in a radiation intensity $I_\lambda(0)$ immediately within the incident surface. This radiation is transmitted a distance L through the melt where it impinges upon a second interface surface at which point the radiation exhibits a reduced intensity level, $I_\lambda(L)$. Some of the radiation impinging upon this far wall is transmitted through the interface and is measured as an intensity designated $I_\lambda^m$. To appreciate the present invention, it should be understood that the measured intensity $I_\lambda^m$ is dependent upon the temperature of the polymer melt. This temperature dependence is more particularly illustrated in the three graphs shown in FIG. 3, which are more particularly discussed below. The relationship between the measured intensity $I_\lambda^m$ and the incident intensity level $I_\lambda^i$ is also more particularly discussed below, especially for the case in which the temperature profile T(s) is approximately parabolic in shape.

Figure 2:
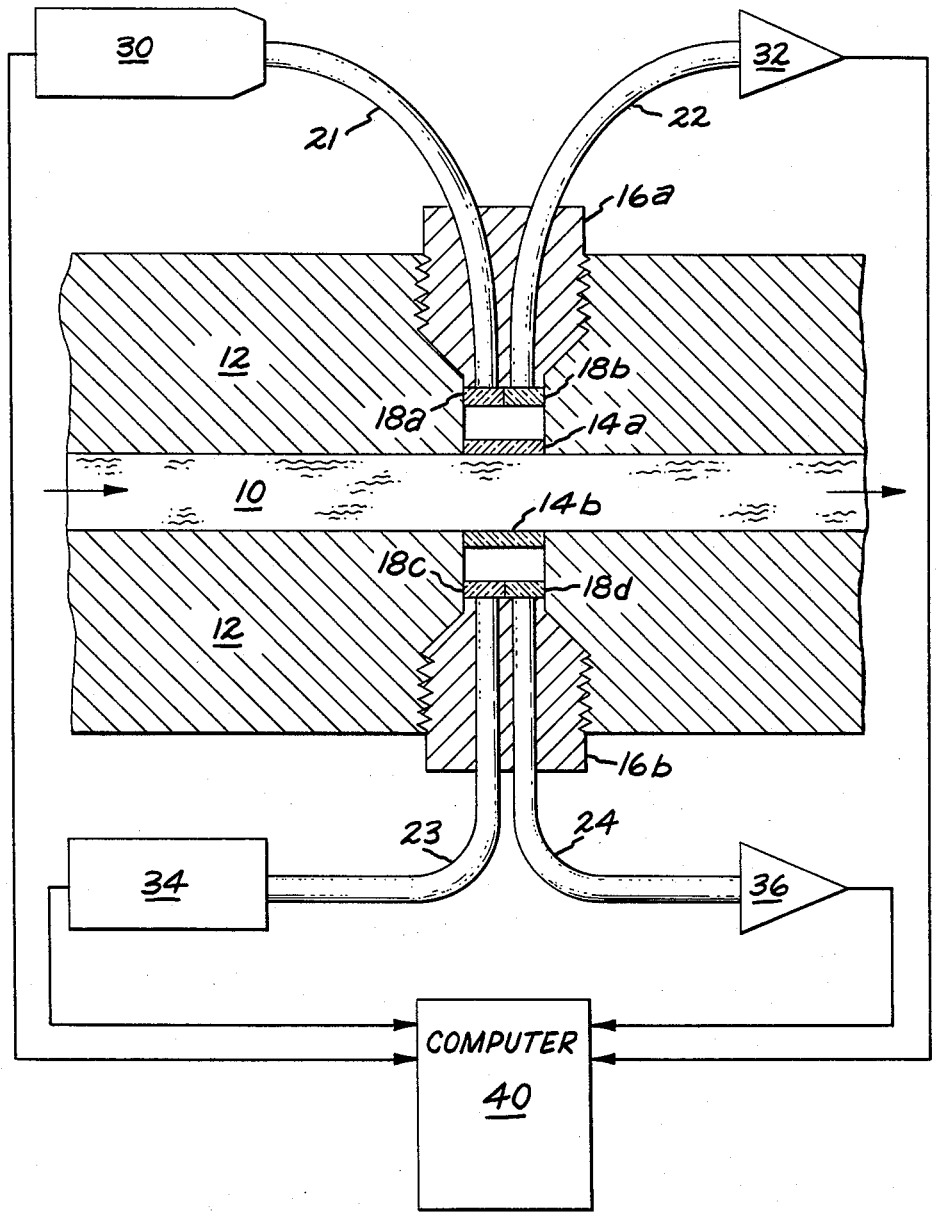
FIG. 2 is a partially cross-sectional side elevation and schematic view illustrating a preferred embodiment of the apparatus of the present invention.

An apparatus for carrying out the purposes of the present invention is particularly illustrated in FIG. 2, in which polymer melt 10 is shown flowing through conduit 12. Conduit 12 preferably possesses at least two apertures therein which are disposed on opposite sides of the polymer melt flow. Optical windows 14 are disposed within these apertures and are selected to pass electromagnetic radiation in the infrared region of the spectrum. A collimated source of electromagnetic radiation 30, preferably operating in the infrared region of the spectrum, supplies an irradiating signal to the polymer melt through optical fiber connector 21 which is disposed through plug 16a, which acts to position optical fibers 21 and 22 and hold them in place. Electromagnetic radiation from optical fiber 21 is directed to optical window 14a and is thereby directed through polymer melt 10 and through lower optical window 14b. The transmitted radiation is received and directed through optical fiber 23 to intensity detector 34. Detector 34 typically comprises a photocell, photodetector, phototransistor or other similar device which operates to generate an electrical signal output in response to the intensity level of electromagnetic radiation received through fiber optic cable 23. This electrical signal is typically supplied to computational means 40 which operates to convert the intensity level signal to a temperature indication, as is more particularly described below. Additionally, computer means 40 also preferably receives an electrical signal from radiation source 30 which is indicative of the level of incident radiation supplied to the opposite side of polymer melt 10.

In one embodiment of the present invention, it is also desirable to have an indication of the surface temperature on one or both sides of the flowing polymer melt. This information is obtained by means of measuring emitted radiation at a wavelength at which the polymer behaves like opaque material to the infrared radiation from the surface of the melt through optical windows 14a and 14b. This emitted radiation is directed through optical fiber cables 22 and 24 to infrared detector heads 32 and 36, respectively, each of which operates to convert incident infrared radiation intensity levels to an electrical signal corresponding to the incident intensity level, which, in turn, is indicative of the surface temperature. Again, in one embodiment of the present invention, the electrical output signals from detector 32 and 36 are supplied to computer means 40 in order to provide surface temperature information. It is noted herein that, in the event that the surface temperature can be assumed to be a constant value for both surfaces (at s=0 and s=L) then only one such surface infrared measurement device is required. It should also be further appreciated that in the event that the surface polymer temperature is a relative constant with respect to time, the value of the surface temperature may be pre-supplied to computer means 40 in which case both detectors 32 and 36 and their associated fiber optic cables are no longer required. However, in the most general mode of operation of the present apparatus, both of these surface temperature measurement systems are preferably included not only to provide accurate surface temperature measurements but also to provide a more accurate determination of the parabolic temperature profile. The determination of such a profile from the measurements taken is more particularly described below. It is also pointed out here that optic fiber cables 22, 24 and 23 are likewise disposed through plugs 16a and 16b, respectively as shown. These plugs preferably possess a shape similar to the standard melt pressure transducer. It is, accordingly, seen that the temperature measurement apparatus of the present invention does not possess any structures which extend into the polymer melt and provides an entirely noncontact means for temperature measurement.

A key factor in the present invention is the selection of an irradiating wavelength range such that it does not coincide with the infrared radiation emitted at the polymer melt temperature. This wavelength can be determined from Wien's displacement law. For example, at a temperature of 350° C. for the processing of ULTEM ®, plastic resin the corresponding wavelength for maximum infrared emission is approximately 4.8 microns. Therefore, the wavelength of the collimated radiation source 30 should be either lower or higher than this value depending upon the absorption characteristics of the particular melt. Under this condition, infrared radiation emitted from the melt can be neglected in comparison to the transmitted fraction of the radiation from the incident beam. The measured intensity present at optical window 14b, designated as $I_\lambda^m$ can be related to the incident intensity $I_\lambda^i$, present at optical window 14a according to the following formula:

$$\frac{I_\lambda^m}{I_\lambda^i} = \frac{\tau_\lambda(1-\rho_\lambda)^2}{1-\rho_\lambda^2\tau_\lambda^2} \tag{1a}$$

where $$\tau_\lambda = \exp\left[-\int_0^L a_\lambda(s)\,ds\right] \quad (1b)$$

and where $\rho_\lambda$ is the interface reflectivity discussed above. See for example "Thermal Radiation Heat Transfer", by R. Siegel and R. Howell, 2nd. Ed., McGraw-Hill (1981). In this equation $a_\lambda(s)$ is the temperature dependent absorption coefficient of the polymer melt at the wavelength of the collimated source. Temperature dependence of $a_\lambda$ is established by performing a transmittance measurement on samples of known thickness and temperature. In attempting to determine the temperature variation within the polymer melt, it is also possible to assume that the temperature profile T(s) is parabolic and has the following equation:

$$T(s) = A + Bs + Cs^2 \quad (2)$$

The constants A and B can be determined from remote infrared measurements of melt surface temperatures at a wavelength where the polymer melt is opaque. Such a measurement is performed by detectors 32 and 36 in the apparatus shown in FIG. 2. It is therefore readily determinable that $T(0) = A$ and that $B = ((T(L) - T(0))/L) - CL$. This relationship may be substituted into the above equation for T(s) to produce the following equation:

$$T(s) = T(0) + \left[\frac{[T(L) - T(0)]}{L} - CL\right]s + Cs^2. \quad (3)$$

Equations 1 and 3 then constitute a working relationship for evaluation of the third constant C which can be determined by simple, well-known iterative computational methods. Programs for such techniques for example are disclosed in Conte & de Boor, "Elementary Numerical Analysis: An Algorithmic Approach", McGraw-Hill, (1972). For example, once an initial estimation for C is made, equation (3) is used to provide a form for T(s). From T(s), $a_\lambda(s)$ at T is determined. Then $\tau_\lambda$ is calculated from equation 1(b) and a check is made to determine if equation (1a) is satisfied. If it is, or is sufficiently closely satisfied, then the solution for T(s) is complete. If equation (1a) is not sufficiently satisfied the constant C is modified in accordance with well-known algorithmic methods, such as Newton-Raphson, and the process is repeated. It is therefore seen that temperature measurements of the polymer melt profile are readily determinable once the constant C has been determined by an iterative computer technique. Thus, the present invention not only provides a measure of the temperature variation at the center of the polymer melt, but also provides, under appropriate conditions, an accurate representation of the temperature profile across the entire flow conduit.

Infrared transmittance spectra data has been obtained for epoxy material confined in an isothermal infrared sample holder which was capable of operating at various temperatures. The sample possessed a thickness of 0.010" and spectral data were obtained at three different temperature levels, namely 29° C., 100° C. and 150° C., this data being plotted as curves A, B and C, respectively, in FIG. 3. FIG. 3 is important in at least two aspects. In particular, in the spectral region between approximately 3.2 and 3.5 microns it is observed that the polymer melt exhibits approximately 0% transmittance. This is indicative of the fact that this spectral region is particularly suitable for surface temperature measurements. In particular, it suggests that appropriate infrared filters 18b and 18d may be used in conjunction with fiber optic cables 22 and 24 to ensure proper response of the detectors to this bandwidth only. Additionally, FIG. 3 is also illustrative of the fact that the spectral region around approximately 3.0 microns is particularly suitable for discriminatory temperature measurements for this particular polymer material. In particular, in the shaded region shown, the region straddling the 3.0 micron spectral line, it is seen that the percentage transmittance is particularly effective in discriminating between various temperature ranges. Other polymer materials will exhibit different curves than that shown in FIG. 3; however, the infrared transmittance spectrum is readily determinable for any particular polymer material. Accordingly, for the particular polymer chosen it is seen that a collimated radiation source 30 operating in the 3 micron range is particularly appropriate for temperature discrimination ability.

Accordingly, it is seen that, in operation, collimated radiation source 30 might comprise a source operating at 3.0 microns. Additionally, source 30 may operate to produce a relatively wide bandwidth of infrared radiation in which case filter elements 18a, 18b, 18c and 18d may be employed to optimize the response of detectors 32, 34 and 36. In particular, in such an arrangement, it is anticipated that filters 18a and 18c are particularly transmissive to infrared radiation in the 3.0 micron region, whereas filters 18b and 18d are particularly transmissive to infrared radiation in the neighborhood of 3.4 microns. Again, these longer wavelengths are more particularly suitable for the determination of surface temperature measurements for the particular material illustrated in FIG. 3.

From the above, it should be appreciated that the present invention provides a method and an apparatus for noncontact determination of temperature profiles within flowing polymer melts. In particular, it is seen that the present invention advantageously employs fiber optic coupling means to reduce spurious readings arising from the presence of nearby sources of infrared radiation. It is also seen that the present invention eliminates all problems associated with the viscous friction heating of thermocouples and other devices which protrude into the flowing melt. It is also seen that the method and apparatus of the present device are capable of providing essentially instantaneous information on the temperature profile of the polymer melt.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An apparatus for temperature profile determination in flowing polymer melts comprising:
   a conduit section for flow-through transport of said melt;
   at least two optical windows disposed in said conduit section, said windows being disposed on opposite sides thereof;

means for irradiating said polymer melt, through a first of said windows, with electromagnetic radiation of a select wavelength, so that said radiation is transmitted through said melt;

means for detecting the level of radiation transmitted through said melt and through the second of said windows, said detecting means generating electrical signals responsive to the intensity of said transmitted radiation;

means for providing temperature data with respect to the surface temperature of said melt, within said conduit, in the vicinity of at least one wall of said conduit windows; and computing means receiving electrical signals from said transmission detection means and operating thereon, along with said surface temperature data, so as to provide an indication of the temperature profile of said melt between said windows.

2. The apparatus of claim 1 in which said surface temperature data providing means comprises an infrared detecting device for generating electrical signals responsive to the temperature of said melt within said conduit in the vicinity of at least one of said optical windows.

3. The apparatus of claim 1 in which said infrared detecting means operates to generate electrical signals responsive to the temperature of said melt within said conduit between said optical windows.

4. The apparatus of claim 1 in which said means for irradiating comprises an infrared laser coupled to a first of said windows by fiber optic cable means.

5. The apparatus of claim 1 in which said irradiating means operates at a wavelength for which said melt is at least semi-transparent and for which said melt exhibits a temperature dependence.

6. The apparatus of claim 1 in which said irradiating means operates at a wavelength of approximately 3.0 microns.

7. A method for temperature profile determination of a flowing polymer melt comprising:

transmitting electromagnetic radiation of selection wavelength and intensity through said melt;

measuring the intensity of the radiation transmitted through said melt;

providing data with respect to the surface temperature of said melt; and determining using computer means, from said intensity measurement and said surface data, a temperature profile across said melt.

8. The method of claim 7 in which said data providing step comprises:

measuring the intensity of radiation emitted at a selected wavelength from said melt surface; and correlating said emitted intensity measurement with a surface temperature level.

9. The method of claim 7 in which the data providing step includes surface temperature data from opposite sides of said polymer melt.

* * * * *

UNITED STATES PATENT AND TRADEMARK OFFICE
CERTIFICATE OF CORRECTION

PATENT NO. : 4,516,864

DATED : May 14, 1985

INVENTOR(S) : Wontaik Kim and Farzin H. Azad

It is certified that error appears in the above-identified patent and that said Letters Patent is hereby corrected as shown below:

Add to the first page, column two add the following cited reference:

"Infrared Radiation Techniques for Glass Surface and Temperature Distribution Measurements by Raymond Viskanta, IEEE Transactions on Industry Applications, Vol. IA-11 No. 5 (1975)."

Signed and Sealed this

Fifth Day of November 1985

[SEAL]

Attest:

Attesting Officer

DONALD J. QUIGG

Commissioner of Patents and Trademarks